United States Patent [19]

Connor et al.

[11] 3,716,667

[45] Feb. 13, 1973

[54] APPARATUS FOR DETECTING THE MOVING AREAS IN A VIDEO SIGNAL

[75] Inventors: Denis John Connor; John Ormond Limb, both of New Shrewsbury; Roger Fabian Wedgwood Pease, Holmdel; William George Scholes, Jackson, all of N.J.

[73] Assignee: Bell Telephone Laboratories, Incorporated, Berkeley Heights, N.J.

[22] Filed: Oct. 26, 1971

[21] Appl. No.: 192,283

[52] U.S. Cl. ....................178/6, 178/DIG. 3, 178/7.1, 325/38 B

[51] Int. Cl. ..................................................H04n 7/12

[58] Field of Search...............178/DIG. 3, 7.1, 6, 6.8; 325/38 B, 38 R; 179/15 BW, 15.55

[56] References Cited

UNITED STATES PATENTS

| | | | |
|---|---|---|---|
| 2,939,909 | 6/1960 | Toulon et al. | 178/6.8 |
| 3,580,999 | 5/1971 | Mounts | 178/7.1 |

*Primary Examiner*—Robert L. Griffin
*Assistant Examiner*—Joseph A. Orsino, Jr.
*Attorney*—R. J. Guenther et al.

[57] ABSTRACT

A frame-to-frame difference signal is developed for each element-to-element difference word corresponding to a picture element in a video signal. The frame-to-frame difference signal for each picture element is combined with the same type signal for the picture element above it in the same video field and the sum is checked against a high threshold level in order to determine whether the picture element is part of a high contrast moving edge. In addition, the frame-to-frame difference signal for each picture element is combined with the frame-to-frame difference signals for all of the picture elements in a predetermined area of the picture to develop a first value whose amplitude is proportional to frame-to-frame differences caused by both movement and quantization noise. A second functional value whose amplitude is proportional to the expected quantization noise in the area of picture elements under consideration is developed in response to the element-to-element difference signals for these picture elements. The second value is subtracted from the first functional value in order to develop a third value whose amplitude is dependent on frame-to-frame differences caused by movement and is relatively insensitive to quantization noise. This third value is checked in a threshold circuit having both a hysteresis effect with respect to amplitude and an increased sensitivity due to previous recognitions of movement in the area encompassing the picture element in order to establish a second indication of movement for the picture element under consideration.

17 Claims, 4 Drawing Figures

APPARATUS FOR DETECTING THE MOVING AREAS IN A VIDEO SIGNAL

BACKGROUND OF THE INVENTION

This invention relates to apparatus for detecting movement in a picture represented by a video signal. More particularly, this invention relates to apparatus which detects movement based on the frame-to-frame differences in a video signal that are caused by movement in the scene being viewed.

In U.S. Pat. No. 3,571,505 of Mar. 16, 1971 to F. W. Mounts, a redundancy reduction system useful in connection with video signals is described. In this type redundancy reduction system an entire frame of video signal samples is stored in both the transmitting and receiving locations. Each new picture element amplitude is compared with the amplitude for that picture element being stored in the transmitting frame memory. If a difference between the two amplitudes is found to exceed a threshold level, the new amplitude is stored in the transmitting frame memory in place of the old amplitude and, in addition, the new amplitude is transmitted to the receiving location. In this way, the receiving frame memory is constantly replenished with the amplitudes of picture elements that have changed. Since the replenishment of video signal amplitudes in these types of systems is done on a conditional basis, these systems have been called conditional replenishment video systems.

Another type of encoder that can be utilized to process video signals is disclosed in the article entitled "Digital Encoding of the Video Signal," by J. B. Millard and H. I. Maunsell, page 459, The Bell System Technical Journal, Vol. 50, No. 2, February 1971. In this type differential pulse code modulation encoder, the difference in amplitude between succeeding samples is encoded as digital bits and transmitted to a receiving location. This element-to-element difference encoder is not as efficient in reducing bit rate as the above-described conditional replenishment encoder but it is simpler and therefore less expensive. The element-to-element difference encoder because of its simplicity may be utilized in the transmission of video signals generated in PICTUREPHONE service where the signals are to be transmitted over relatively short distances. Where transmission is to take place over much longer distances, the increased cost of the transmission facility justifies the use of the more complicated conditional replenishment video encoder. Hence, both of these encoders may find use in the transmission plant that is utilized in connection with PICTUREPHONE service.

The quantizing which takes place in the element-to-element difference encoder causes a frame-to-frame noise to be introduced into any video signal that has been processed by such an encoder. If such a previously encoded video signal is then coupled to the input of a conditional replenishment type video encoder, the frame-to-frame noise which results from this quantization has been determined to result in the selection of picture elements for transmission by the conditional replenishment encoder even though the frame-to-frame differences have not been caused by movement in the picture. As a result, a larger number of picture elements are required to be transmitted by the conditional replenishment system and the efficiency of this type of system is accordingly reduced.

SUMMARY OF THE INVENTION

A primary object of the present invention is to detect movement in a video signal which has been previously distorted by a frame-to-frame noise such as the quantization noise in an element-to-element difference encoder. This object and others are achieved in accordance with the present invention wherein the frame-to-frame difference signals for an area of picture elements are utilized in determining whether or not the input picture element belongs to an area of movement.

In the present invention, advantage is taken of the difference in properties between the frame-to-frame differences which have resulted from movement and the frame-to-frame differences which have been caused by the element difference quantizer. There are two important properties of the frame-to-frame differences that have resulted from movement: (1) they are spatially correlated and (2) they are temporally correlated. These differences are spatially correlated in the sense that movement which has caused a frame-to-frame difference at one spatial point is very likely to cause a frame-to-frame difference in the surrounding spatial points. They are temporally correlated in that movement which has caused a frame-to-frame difference at a given spatial point in one video frame is also likely to cause a frame-to-frame difference at that same spatial point during succeeding video frames.

There are three important characteristics of the frame-to-frame differences caused by the element-to-element difference quantizer: (1) they are uncorrelated spatially, (2) they are dependent on the magnitude of the element-to-element difference signal being quantized and (3) their magnitudes are proportional to the spacing of the representative quantization levels. The present invention exploits the differences in the properties of these two classes of frame-to-frame difference signals in order to separate out the frame-to-frame difference signals that have resulted from movement in the picture.

The frame-to-frame difference signals for an area of picture elements including the one presently under consideration are integrated, or summed, in order to obtain a first functional value. This first functional value has an amplitude which is dependent on both the frame-to-frame differences which have resulted from movement and the frame-to-frame differences which have resulted from the quantization process. A second functional value is generated by first forming a modified element difference signal in response to the element-to-element difference values presented at the input of the encoder for all of the picture elements being summed in the area under consideration. These modified element difference signals are proportional in their magnitudes to the spacing between the corresponding quantization levels. The modified element difference signals for all of the spatial points in the area under consideration are summed in a second spatial integrator in order to obtain the second functional value. This second functional value is proportional to the expected frame difference noise due to quantization in the area of picture elements under consideration. By subtracting this second functional value from the first functional value, an amplitude is obtained which is effectively an average frame difference signal with compensation for the detail dependent variations of the frame difference noise. This value resulting from the subtraction process is a very sensitive indicator of spatially correlated frame differences and it is relatively insensitive to quantization noise. This value obtained from the subtraction process can be compared with a threshold level in order to determine whether or not the picture element under consideration should be deemed to belong to an area of movement.

In accordance with a primary feature of the present invention, the result obtained by comparing the subtraction value with a threshold level is taken as one vote in a plurality of votes to indicate that movement has occurred in the area. This vote plus the votes obtained from preceding and following picture elements in the line and the votes obtained for picture elements in the lines of the previous field above and below the present line are summed in order to obtain a composite vote. If this composite vote exceeds a predetermined threshold level, the picture element presently under consideration is deemed to belong to an area of movement. In this way, advantage is taken of the fact that the frame-to-frame difference signals caused by movement are temporally correlated in that votes for movement caused by picture elements in the previous field increase the sensitivity of the threshold circuit to votes which are cast during the present field. This threshold circuit with temporal sensitivity is also caused to exhibit a hysteresis effect by requiring a higher threshold level before movement is indicated than the threshold level which is required to remove an indication of movement.

BRIEF DESCRIPTION OF THE DRAWINGS

The invention will be more readily understood after reading the following detailed description taken in conjunction with the drawings, in which.

DETAILED DESCRIPTION

In the following embodiment, the video signal which is encoded is of the standard type, having lines and fields separated by time intervals commonly referred to as horizontal and vertical blanking intervals with the periodicity for each picture element equal to a frame interval. The frame interval is composed of two field intervals each one of which contains picture elements from video lines that are interlaced with video lines from the other field. It will be apparent to those skilled in the art, however, that the invention is equally applicable to a video signal which results from simple line-sequential scanning.

Figure 1:
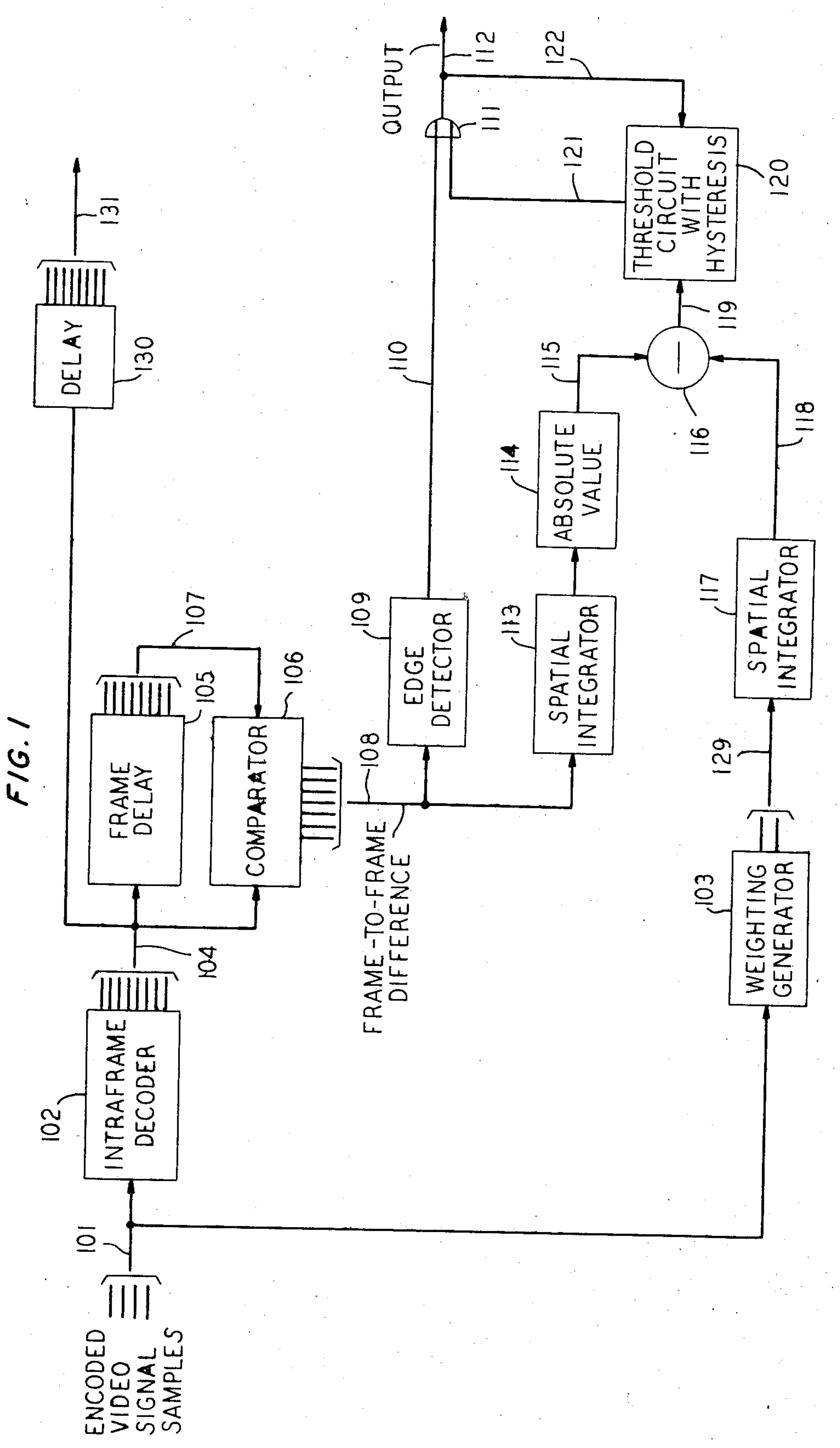
FIG. 1 is a schematic block diagram of an embodiment constructed in accordance with the present invention.

In FIG. 1, 4-bit digital words are presented on bus 101, each one of which corresponds to the element-to-element difference between adjacent picture elements in a video signal. This type of sample results from the differential pulse code modulation coder described in the above-identified article from The Bell System Technical Journal. Each element-to-element difference word on bus 101 is coupled to the input of an intraframe decoder 102. Intraframe decoder 102 detects the element-to-element difference signal and provides eight-bit video signal samples on bus 104. This decoder may be identical to the one described in the above-identified The Bell System Technical Journal article.

Each eight-bit digital word on bus 104 is coupled to the input of a frame delay memory 105 and to one input of a comparator circuit 106. After a time delay equal to one video frame, an eight-bit digital word appears at the output of frame delay memory 105 on bus 107. As shown in FIG. 1, each digital word on bus 107 is coupled to a second input of the comparator circuit 106. As a result, comparator circuit 106 is provided with two eight-bit digital words at its inputs, each one of which represents the video amplitude for the same spatial point within the spatial point format of the video frame. The two eight-bit digital words may differ in amplitude, however, either because movement has occurred in the picture from one video frame to the next or because the quantization process within the element-to-element difference apparatus has resulted in the introduction of quantization noise.

The apparatus which has been described up to this point in the detailed description is well known to those skilled in the art as apparatus which is part of a conditional replenishment video encoder that is working with an element-to-element difference signal at its input. The frame-to-frame difference signals on bus 108 at the output of comparator circuit 106 in the absence of a frame-to-frame noise will simply represent changes in the picture element amplitudes that have resulted from movement in the scene being viewed. In prior art systems, these frame-to-frame difference signals are simply checked against a threshold level, and if the threshold level is exceeded, the new amplitude value on bus 104 is transmitted to the receiving location.

Each digital word on bus 108 is coupled to the input of an edge detector 109 wherein it is combined with at least one frame-to-frame difference signal from a spatial point above the one presently under consideration. As will be described hereinafter, the summation of the frame-to-frame difference signals for these spatial points is then compared with a high threshold level. This level is, in fact, high enough such that a frame-to-frame difference signal resulting from quantization noise is unlikely to exceed this level. On the other hand, many frame-to-frame differences caused by movement of low contrast areas are also likely to not exceed the high threshold level within edge detector 109. To insure that a random noise spike on an individual picture element will not result in an output from edge detector 109, this detector also incorporates apparatus for inhibiting the indication of movement at a picture element where the picture elements both preceding and following that picture element have not resulted in an indication of movement. For the slow-moving, high-contrast edges, however, edge detector 109 does produce a logical "1" output on line 110 which is then coupled through OR gate 111 to an output line 112.

Each frame-to-frame digital word on bus 108 is also coupled to the input of a spatial integrator 113. The frame-to-frame difference signal for the picture element presently under consideration is combined within spatial integrator 113 with the frame-to-frame difference signals for the picture elements both preceding and following the picture element under consideration and, in addition, with the frame-to-frame difference signals for the picture elements in the previous video line. This combination is simply a summation of the frame difference signals for the picture elements in an area roughly centered about the picture element presently under consideration. The result achieved in spatial integrator 113 is coupled to the input of an absolute value decoder 114 wherein the sign of the result is forced to be a positive value, and the result is then coupled by way of line 115 to one input of a subtractor circuit 116. The magnitude of the signal produced on line 115 is, of course, dependent on whether or not movement has occurred in the area of picture elements being considered within spatial integrator 113. Since frame-to-frame difference signals caused by movement tend to be spatially correlated, this type of frame-to-frame difference signal over the area of spatial elements will combine to enhance the value on line 115. Nevertheless, any frame-to-frame difference signals which have been produced as a result of the quantization process within the element-to-element difference apparatus will also contribute to modify the value of the signal on line 115. Since these types of frame-to-frame difference signals are uncorrelated spatially, they will in fact tend to cancel each other within the summation taking place within spatial integrator 113.

Each element-to-element difference word on bus 101 is also coupled to the input of a weighting generator 103. For each element-to-element difference word present on bus 101, weighting generator 103 provides a positive value at its output on bus 129 which is dependent on the spacing between the quantization level represented by the digital word on bus 101 and the adjacent quantization levels. In the present embodiment where the element-to-element difference apparatus operates with quantization levels equal to ±2, 6, 14, 30, 46, 62, 78 and 94 (out of 256 possible signal levels), the weighting generator 103 is caused to produce values at its output equal to 0, 0, 4, 8, 8, 8, 8 and 8, respectively. Hence, for each of the inner quantization levels the output of weighting generator 103 is equal to zero and for each of the outer quantization levels the output of weighting generator 103 is equal to approximately one-half of the spacing between adjacent quantization levels. In a sense, weighting generator 103 provides a signal at its output on bus 129 which mimics the noise that is expected to be present in the frame-to-frame difference signals on bus 108.

The output levels present on bus 129 for each of the spatial points under consideration within spatial integrator 113 are combined through a summation process in spatial integrator 117 to provide a signal on line 118 whose value is proportional to the expected frame-to-frame difference noise within the area under consideration. This signal on line 118 is then subtracted within subtractor circuit 116 from the signal on line 115 to generate a value on line 119 which represents by its amplitude an average frame-to-frame difference signal for the area under consideration with compensation for the frame-to-frame noise due to the detail dependent variations.

The level of signal on line 119 is a very sensitive indicator of spatially correlated frame-to-frame differences. It is relatively insensitive to quantization noise. Accordingly, a useful movement detector could be implemented by simply comparing the level of the signal on line 119 with a predetermined threshold value. If the signal is found to exceed this threshold value, movement can be deemed to occur for the picture element presently under consideration. This indication of movement could then be combined with the output of edge detector 109 to provide a very workable movement detector. Nevertheless, to increase the quality of performance, the signal on line 119 is coupled to the inputs of a threshold circuit with hysteresis designated in the drawings as 120. This latter threshold circuit takes each amplitude sample presented on line 119 and compares it with a predetermined threshold level. For each amplitude on line 119 that exceeds the threshold level, one vote is cast for movement in the area. These votes for movement are totaled within threshold circuit 120 for the picture elements both preceding and following the picture element in the line presently under consideration. This total is added to votes for movement that have been generated for the picture elements in the lines of the previous field both above and below the line presently under consideration. Only when this composite total of votes from an area of picture elements exceeds a predetermined threshold value does the threshold circuit 120 produce an output by way of line 121 to an input of OR gate 111.

Either the output from edge detector 109 or the output from threshold circuit 120 may therefore cause an output on line 112 to indicate that movement has been deemed to occur for the spatial point presently under consideration. This indication of movement is then coupled by way of line 122 back into threshold circuit 120 in order to increase the sensitivity on threshold circuit 120 to the possibility of movement in that area during the next field interval. The precise operation of threshold circuit 120 will be more readily appreciated after the discussion hereinafter of the apparatus shown in FIG. 3.

Figure 3:
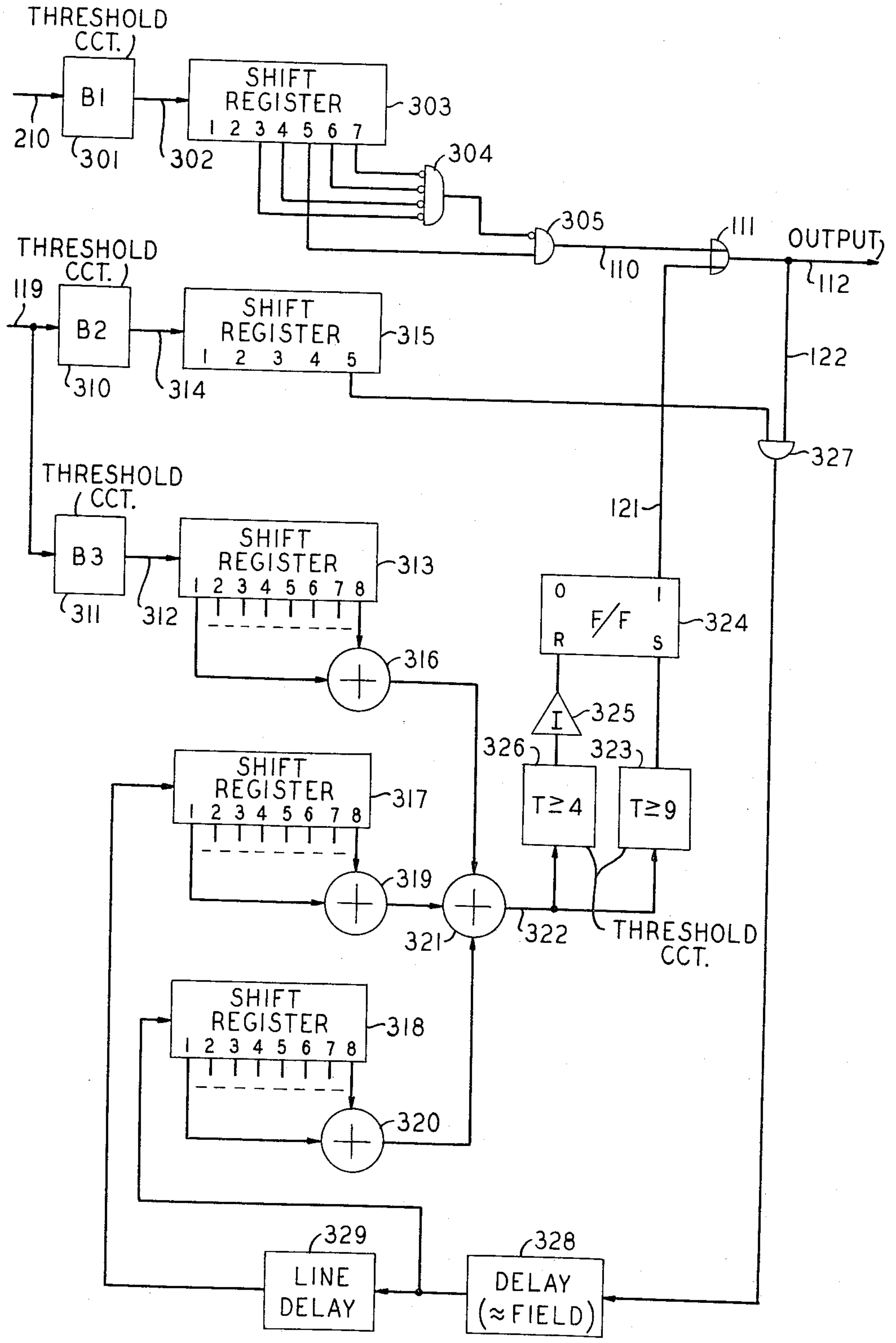
FIGS. 2 and 3 when placed together in accordance with the diagram given in FIG. 4 provide a more detailed schematic block diagram of the apparatus shown in block form in FIG. 1.
Figure 2:
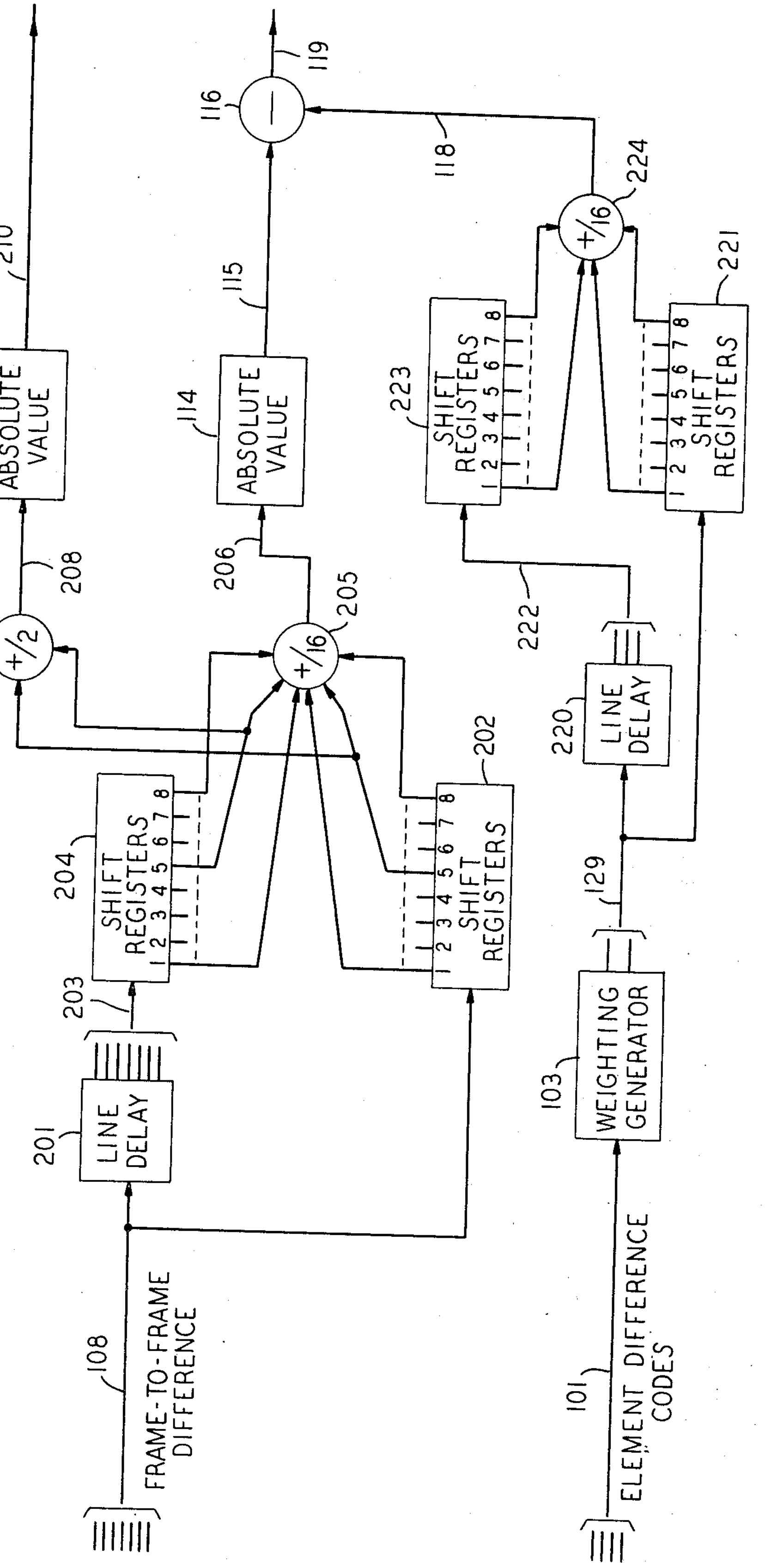
Figure 4:
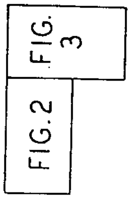

As will be readily apparent after a more thorough discussion in connection with the apparatus shown in FIGS. 2 and 3, delay is inherent in the operation of the spatial integrator 113 and the threshold circuit with hysteresis 120. As a result, the so-called picture element under consideration is not actually present on bus 104 when a determination is made on line 112 as to whether or not movement has occurred. In the present embodiment, operation of the spatial integrator and threshold circuit with hysteresis introduces a delay of approximately ten picture elements in duration. To provide the picture element amplitude to which the movement indication on line 112 corresponds, the digital words on bus 104 are coupled to the input of the delay circuit 130 having a delay equal to the time duration between ten picture elements. Accordingly, each picture element amplitude presented by the digital word on bus 131 at the output of delay 130 will have a corresponding indication on line 112 as to whether or not that picture element amplitude belongs to an area of movement. In a conditional replenishment type encoder this logical signal on line 112 can be used to determine whether or not the picture element amplitude on bus 131 should be gated through to a transmission channel.

In FIG. 2 each digital word on bus 108 (representing a frame-to-frame difference in picture element amplitudes having the same spatial point in the video frame) is coupled to the input of a delay line 201 and to the input of shift registers 202. Each block designated as shift registers in FIG. 2 is actually constructed of a plurality of shift registers equal in number to the number of bits in the digital word coupled to its input. Each shift register of the plurality is coupled to receive a different one of the bits in the digital word. Shift registers 202 has a capacity to store eight adjacent picture element amplitudes. Each new digital word that is presented on bus 108 is coupled into cell 1 of shift registers 202, and the digital words which were present in the cells are each caused to shift to a cell having one digit higher in value.

Delay line 201 presents delay to the digital words on bus 108 equal in duration to the time interval of one video line. Accordingly, when a picture element amplitude is presented on bus 108 the picture element amplitude for the picture element directly above it in the preceding video line is present on bus 203 at the output of delay line 201. This digital word on bus 203 is coupled into cell 1 of shift registers 204. Hence, shift registers 202 and 204 store the picture element amplitudes for eight picture elements in each of two adjacent video lines in each video field.

The digital word present in each of the cells of shift registers 202 and 204 is coupled to one input of a 16-input averaging circuit 205. This averaging circuit, like averaging circuits 207 and 224 to follow, is actually constructed of an addition circuit followed by a divider circuit which divides the sum out of the addition circuit by a constant equal to the number of inputs to the addition circuit. The resulting signal on line 206 out of averaging circuit 205 is coupled to the input of an absolute value detector 114 which in turn presents the absolute value of the signal on line 115. This value presented on line 115 is therefore equal to the absolute magnitude of the average of all frame-to-frame difference values for the picture elements in an area encompassing eight picture elements in each of two video lines of the video field. The invention is, of course, in no way limited to the particular number of picture elements and video lines shown in the present embodiment.

The digital words present in cell 5 of each of the shift registers 202 and 204 are coupled to the inputs of an averaging circuit 207. The resulting signal out of circuit 207 is coupled by way of line 208 to an absolute value detector 209. The resulting value on line 210 is equal to the absolute value of the average of the frame-to-frame difference values for two picture elements vertically adjacent to each other in the spatial point format of the video field. The picture element amplitude in cell 5 of shift registers 202 is the picture element presently under consideration. The picture element amplitudes stored in cells 6, 7 and 8 of shift registers 202 correspond to the picture elements which precede the picture element presently under consideration, whereas the picture element amplitudes stored in cells 1, 2, 3 and 4 correspond to the picture elements which follow the picture element presently under consideration.

The absolute value obtained on line 210 is coupled to the input of a threshold circuit 301 in FIG. 3. If the value on line 210 exceeds the threshold level within circuit 301, an energizing signal equivalent to a logical "1" is coupled by way of line 302 into cell 1 of a shift register 303. In the present embodiment wherein the video signal amplitudes are permitted a range of 256 levels, the threshold level for circuit 301 is set equal to 10. This level is high enough such that it is unlikely to be exceeded by any quantization noise which may have resulted during the picture elements corresponding to cell 5 in each of the shift registers 202 and 204. Therefore, the threshold level of circuit 301 is high enough so that it is generally exceeded only as a result of a slowly moving high contrast edge in the picture or as a result of a spike of noise in either of the picture elements corresponding to cell 5 in each of the shift registers 202 and 204. To eliminate those logical "1's" which are presented on line 302 as a result of an isolated noise spike, the logical levels present on line 302 are coupled into an isolated point rejection circuit consisting of shift register 303, AND gate 304 and AND gate 305. Shift register 303 is clocked at a rate equal to that at which element difference codes are presented on bus 101. Since shift register 303 has a capacity of seven cells, it therefore stores the logical states produced on line 302 during seven adjacent picture elements. If a logical "1" is present in cell 5 of shift register 303, it is coupled through AND gate 305 to produce an energizing signal on line 110 providing an energizing signal is not simultaneously present at the inhibit input of AND gate 305. Each of the cells 3, 4, 6 and 7 of shift register 303 is coupled to an inhibit input of AND gate 304 whose output in turn is connected to the inhibit input of AND gate 305. Hence, if cells 3, 4, 6 and 7 each contains a logical "0," the logical "1" present on cell 5 is inhibited by gate 305 and therefore no energizing signal results on line 110. The situation presented when the energizing signal in cell 5 is prohibited from causing an energizing signal on line 110 corresponds to the case where an isolated spike of noise may have caused a frame-to-frame difference in the picture element corresponding to cell 5. In this type situation, since the frame-to-frame difference has not been produced by movement, the picture elements corresponding to cells 3, 4, 6 and 7 will not have produced frame-to-frame difference values of sufficient magnitude to exceed the threshold level in circuit 301. Here again, as in shift registers 202 and 204, a delay of approximately five picture elements is introduced between the logical signal of interest on line 302 and its corresponding output on line 110. As will be apparent hereinafter, the remainder of the apparatus shown in FIG. 3 also introduces a delay approximately equal to five picture elements between the absolute value detector 114 and the corresponding output signal on line 121.

As pointed out hereinabove in connection with FIG. 1, each element difference code presented on bus 101 is coupled to the input of a weighting generator 103. In response to each of these element difference codes, weighting generator 103 produces a value of either 0, 4 or 8 at its output on bus 129. As is further pointed out hereinabove, the particular value which is provided is dependent on the element difference code presented on bus 101. Each value presented on bus 129 is coupled to the input of a delay line 220 and into cell 1 of shift registers 221. After a delay equal in duration to one video line, the value coupled into line delay 220 is coupled by way of bus 222 into cell 1 of shift registers 223. Each of the shift registers 221 and 223 is actually constructed of two shift registers, each one of which stores one bit of the two-bit digital word coupled to its input. By storing eight digital words in each of the shift registers 221 and 223, the values produced by weighting generator 103 during the picture elements corresponding to the frame differences stored in shift registers 202 and 204 are stored within shift registers 221 and 223. The values stored in each of the cells of shift registers 221 and 223 are coupled to an input of an averaging circuit 224. The resulting signal on line 118 from the output of averaging circuit 224 represents an average value for the quantization noise that could have resulted in frame-to-frame difference signals in the area of picture elements under consideration. By subtracting this value on line 118 from the value on line 115, subtraction circuit 116 produces a value on line 119 which is relatively insensitive to quantization noise. As pointed out hereinabove, this value on line 119 could be simply checked against a threshold level lower than that of circuit 301 and any resulting energizing signals could be taken as indications that movement has occurred within the area under consideration. To increase the efficiency of performance, however, the apparatus shown in FIG. 3 designated by the numerals 310 through 329 provide the operation described hereinabove in connection with threshold circuit with hysteresis 120.

The signal on line 119 is converted into two binary functions by threshold circuits 310 and 311. If the signal on line 119 exceeds the predetermined threshold level of circuit 311, an energizing signal equivalent to a logical "1" is produced on line 312 at the input of a shift register 313. Similarly, if the signal on line 119 exceeds the threshold level of circuit 310, an energizing signal is produced on line 314 at the input of a shift register 315. The threshold levels of circuits 311 and 310, designated in the drawings as B3 and B2, respectively, are adjusted in the present embodiment such that B3 is greater than B2. In the present embodiment where the video signal is permitted to assume any one of 256 levels, B3 is adjusted to a threshold level of 4, and B2 is adjusted to a threshold level of 2. Shift registers 313 and 315, like shift register 303, are clocked at the picture element rate.

The logical states produced on line 312 during eight picture elements are stored within shift register 313. Each logical "1" stored within shift register 313 represents one vote in favor of indicating that movement has occurred in the area including the eight picture elements corresponding to the cells in shift register 313. All eight cells in shift register 313 are coupled to the inputs of a summation circuit 316. In a similar fashion, votes which are cast for movement during the picture elements in the lines of the previous field (above and below the line presently being considered in shift register 313) are stored, in a manner to be described hereinafter, within shift registers 317 and 318, respectively. The energizing signals stored in the cells of shift registers 317 and 318 are summed in summation circuits 319 and 320, respectively. The sums produced at the output of each of the summation circuits 316, 319 and 320 are added in a final summation circuit 321 to produce an overall summation of votes on line 322 for an area of picture elements roughly centered about the picture element corresponding to cell 5 in shift register 313.

If the signal on line 322 indicates that nine or more of the twenty-four cells in shift registers 313, 317 and 318 are storing logical "1's", then threshold circuit 323 energizes the set input of a flip-flop 324. With flip-flop 324 set, an energizing signal is provided to OR gate 111 by way of line 121. This energizing signal will remain on line 121 as long as flip-flop 324 remains in its set state. Flip-flop 324 is reset when the inverting circuit 325 produces a logical "1" signal at its output. This in turn will occur only when the level on line 322 drops to a point which is equivalent to less than four votes out of the total number of 24 votes represented by logical "1's" in shift registers 313, 317 and 318. This hysteresis type operation is achieved by coupling the signal on line 322 to the input of a threshold circuit 326 whose output energizes the input of inverting circuit 325 for all signal levels on line 322 corresponding to four or more votes out of the total number of 24 votes. In the fashion described thus far in connection with circuits 310 through 326, advantage is taken of the spatial correlation of frame-to-frame difference signals which have resulted in movement to produce an indication of movement on line 112.

The logical state produced on line 314 is simply delayed by an interval equal to five picture elements in shift register 315. This delayed logical state is coupled from the output of the fifth cell in shift register 315 to one input of an AND gate 327. The other input of AND gate 327 is coupled by way of line 122 to the output line 112. If an output energizing signal appears on line 112 and, in addition, the signal on line 119 for the corresponding picture element has exceeded the threshold level on circuit 310, AND gate 327 provides an energizing signal to the input of a delay memory 328. This memory introduces a delay approximately equal to one video field minus one-half of a video line time. As a result, an energizing signal provided at its input will be coupled from the output of memory 328 into the first cell of shift register 318 when the picture element from the other field immediately above it in the spatial format of picture elements is being coupled into the first cell of shift register 313. The output energizing signal from delay memory 328 is also coupled into a line delay 329. As a result, the energizing signal for a given picture element at the output of line delay 329 will be present at the input of shift register 317 when the logical state corresponding to the picture element immediately below it in the spatial format of picture elements is present on line 312. In this way, any indications of movement that occur on line 112 during one video field in an area of picture elements encompassing eight picture elements of two adjacent video lines are caused to increase the sensitivity of the threshold circuit to any votes for movement during the next video field in the line which interlaces the above-mentioned two adjacent video lines.

In the present embodiment, where the threshold level of threshold circuit 323 is equal to nine and the votes for only eight picture elements are registered in shift register 313, indications of movement by threshold circuit 120 (circuits 310–329) will not be developed unless circuit 120 has been previously sensitized by the indications of movement in a previous field which have been developed by the edge detector 109 (circuits 301–305). In a first field containing movement, it is the edge detector 109 which will first develop the energizing signals on output line 112. These signals during the first field will in turn increase the sensitivity of threshold circuit 120 to indications of movement in an area surrounding the moving edge detected by detector 109. During subsequent fields, threshold circuit 120 will then sweep out an area of picture elements surrounding the edge which has caused the initial indication of movement. Once movement has been detected in an area, however, threshold circuit 120 will continue to sweep that area even though the edge has passed out of the area since the threshold required to deactivate circuit 120 is set by threshold circuit 326 at a level less than the total number of picture elements in each line under consideration.

The present invention is, of course, in no way limited by the particular thresholds used in the present embodiment or by the particular area of picture elements chosen in the present embodiment. Numerous modifications may be made by those skilled in the art without departing from the spirit and scope of the present invention.

We claim:

1. Apparatus for selecting input samples from a video signal which belong to a moving area in the picture being encoded, said apparatus comprising means for generating a frame-to-frame difference for each of said input samples, means for generating a first value in response to the frame-to-frame differences for input samples in a picture area encompassing a plurality of picture elements, means for generating a second value representing an expected noise level for the input samples in said picture area, and means responsive to a difference between said first value and said second value for generating an energizing signal to indicate that a particular one of said input samples belongs to a moving area.

2. Apparatus as defined in claim 1 wherein said means for generating a first value includes means for obtaining an absolute value of the weighted algebraic sum of the frame-to-frame difference for said input samples in said picture area.

3. Apparatus as defined in claim 2 wherein said means for generating a second value includes means for developing an expected noise value in response to each of said input samples, and means for obtaining a weighted summation of the expected noise values corresponding to input samples from said picture area.

4. Apparatus as defined in claim 1 wherein said means for generating an energizing signal includes threshold means for generating a predetermined logic state for each input sample during which said difference between said first value and said second value exceeds a predetermined threshold level, means for counting said predetermined logic states over a predetermined number of input samples, and means for generating said energizing signal when the number of stored predetermined logic states exceeds a predetermined value.

5. Apparatus for identifying input samples from a video signal which belong to a moving area in the picture being encoded, said apparatus comprising means for generating a frame-to-frame difference for each of said input samples, means for developing a summation of the frame-to-frame difference of a selected input sample plus the frame-to-frame difference of a previous input sample having a spatial point location above said input sample in said picture, threshold means responsive to said summation for developing an energizing signal when said summation exceeds a predetermined threshold level, means responsive to said energizing signal from said threshold means for developing a first indication of movement, means for generating a first value in response to the frame-to-frame differences for input samples in a picture area encompassing a plurality of picture elements including the picture element corresponding to said selected input sample, means for generating a second value representing an expected noise level for said input samples in said picture area, and means responsive to a difference between said first value and said second value for developing a second indication of movement in said picture.

6. Apparatus as defined in claim 5 wherein said means for developing the first indication of movement includes an isolated point rejection means for inhibiting an indication of movement when an energizing signal output from said threshold means during one input sample is preceded and followed by input samples that do not result in energizing signals at the output of said threshold means.

7. Apparatus as defined in claim 5 wherein said means for generating a first value includes means for developing a weighted summation of frame-to-frame differences for input samples in said picture area.

8. Apparatus as defined in claim 7 wherein said means for generating a second value includes means for developing an expected noise value in response to each of said input samples and means for algebraically summing said expected noise value for the input samples in said picture area.

9. Apparatus as defined in claim 8 wherein said means for developing a second indication of movement includes threshold means for developing a predetermined logic state for each input sample during which the difference between said first value and said second value exceeds a second predetermined threshold level, means for counting the number of predetermined logic states developed over a predetermined number of input samples, and means for developing said second indication of movement when the count of said predetermined logic states exceeds a predetermined number.

10. Apparatus for determining whether an input sample from a plurality of video signal samples belongs to a moving area in the picture represented by said video signal, said apparatus comprising means for developing a frame-to-frame difference signal for each of said plurality of video signal samples, means for storing frame-to-frame difference signals corresponding to said input sample and to video signal samples from a predetermined picture area around said input sample, means for generating a first value in response to the algebraic sum of the frame-to-frame difference signals in said means for storing, means responsive to said video signal samples for generating a second value representing the expected amplitude of noise in said first value, means for subtracting said second value from said first value to obtain a third value whose amplitude is an indication of movement in said predetermined area, and means responsive to said third value for generating an energizing signal to indicate that said input sample belongs to a moving area.

11. Apparatus as defined in claim 10 wherein the apparatus further includes a summation means for obtaining an algebraic sum of the frame-to-frame difference signal corresponding to said input signal and the frame-to-frame difference signal corresponding to at least one other input signal in said storage means, threshold means for generating an energizing signal in response to an output from said summation means which exceeds a predetermined threshold level, and means responsive to the energizing signal from said threshold means for developing an indication that said input sample belongs to a moving area.

12. Apparatus as defined in claim 11 wherein said means for developing an indication of movement includes means for inhibiting an indication of movement when an energizing signal from said threshold means corresponding to said input sample is preceded and followed by input samples that do not result in an energizing signal out of said threshold means.

13. Apparatus for identifying the video signal samples that belong to a moving area in the picture represented by said video signal samples, said apparatus comprising means responsive to said video signal samples for developing a frame-to-frame difference signal for each of said video signal samples, means responsive to frame-to-frame difference signal corresponding to a predetermined number of video signal samples for developing a first indication of movement, means for generating a movement signal whose amplitude is a function of the frame-to-frame difference signals corresponding to a predetermined number of video signal samples, threshold means having a variable sensitivity for developing a second indication of movement in response to the amplitude of said movement signal during a predetermined number of input samples, and means responsive to either a first or a second indication of movement and to the amplitude of aid movement signal for changing the sensitivity of said threshold means.

14. Apparatus as defined in claim 13 wherein said threshold means for developing a second indication of movement includes a threshold circuit for developing an energizing signal during each video signal sample when said movement signal exceeds a predetermined threshold level, and first memory means for storing the energizing signals produced by said threshold circuit during a predetermined number of video signal samples.

15. Apparatus as defined in claim 14 wherein said video signal samples occur in periodic field intervals, said means for changing the sensitivity develops an energizing signal in response to a movement signal in excess of a predetermined level being simultaneously present with either a first or a second indication of movement, and said means for developing a second indication of movement further includes means for delaying the energizing signal from said means for changing the sensitivity by a duration equal to one field interval, and a second memory means for storing the delayed energizing signals which occur during a second predetermined number of video signal samples.

16. Apparatus as defined in claim 15 wherein said threshold means for developing a second indication of movement further includes summation means for determining the total number of energizing signals stored in said first and second memory means, and a second threshold circuit for developing said second indication of movement when the total number of stored energizing signals exceeds a third predetermined number.

17. Apparatus as defined in claim 16 wherein said second threshold circuit includes a hysteresis-type threshold circuit which maintains said second indication of movement when said total number of energizing signals is less than said third predetermined number.

* * * * *